US012427696B2

United States Patent
Xu et al.

(10) Patent No.: US 12,427,696 B2
(45) Date of Patent: Sep. 30, 2025

(54) GRANULATION PROCESSING METHOD FOR LOW-MELT-INDEX DEGRADABLE MATERIAL, AND SHAPED BODY PREPARED THEREBY

(71) Applicants: SHANGHAI BLUEPHA MICROBIOLOGY TECHNOLOGY CO., LTD., Shanghai (CN); JIANGSU LANSU BIOMATERIAL CO., LTD., Jiangsu (CN)

(72) Inventors: Yong Xu, Beijing (CN); Shenghui Li, Beijing (CN); Zhiyu Ma, Beijing (CN); Yiming Ma, Beijing (CN); Teng Li, Beijing (CN); Haoqian Zhang, Beijing (CN)

(73) Assignees: SHANGHAI BLUEPHA MICROBIOLOGY TECHNOLOGY CO., LTD., Shanghai (CN); JIANGSU LANSU BIOMATERIAL CO., LTD., Jiangsu (CN)

( * ) Notice: Subject to any disclaimer, the term of this patent is extended or adjusted under 35 U.S.C. 154(b) by 0 days.

(21) Appl. No.: 18/851,627

(22) PCT Filed: May 19, 2023

(86) PCT No.: PCT/CN2023/095256
§ 371 (c)(1),
(2) Date: Sep. 26, 2024

(87) PCT Pub. No.: WO2024/183156
PCT Pub. Date: Sep. 12, 2024

(65) Prior Publication Data
US 2025/0108537 A1 Apr. 3, 2025

(30) Foreign Application Priority Data
Mar. 9, 2023 (CN) .......................... 202310221017.9

(51) Int. Cl.
*B29B 9/06* (2006.01)
*B29K 67/00* (2006.01)

(52) U.S. Cl.
CPC ............ *B29B 9/06* (2013.01); *B29K 2067/00* (2013.01)

(58) Field of Classification Search
None
See application file for complete search history.

(56) References Cited

U.S. PATENT DOCUMENTS 5,149,193 A * 9/1992 Faillace ................ B29C 48/832
425/170

FOREIGN PATENT DOCUMENTS

| CN | 102040736 A | 5/2011 |
|---|---|---|
| CN | 102977624 A | 3/2013 |

(Continued)

OTHER PUBLICATIONS

International Search Report and Written Opinion for corresponding International application No. PCT/CN2023/095256; dated (14 pages) Machine Translation.

(Continued)

*Primary Examiner* — Susan D Leong
*Assistant Examiner* — Xinwen Ye
(74) *Attorney, Agent, or Firm* — MENDELSOHN DUNLEAVY P.C.; Kevin J. Dunleavy (57) ABSTRACT

The present application relates to the technical field of processing of degradable materials, and in particular to a granulation processing method for a low-melt-index degradable material, and a shaped body prepared thereby. The granulation processing method for the degradable material provided by the present invention comprises: reducing the temperature of a screw rod for multiple times and increasing the rotating speed of the screw rod during an extrusion (Continued)

crystallization granulation process. The granulation processing method provided by the present invention is beneficial to improving the crystallization rate of the material during the granulation processing process, and reduces the influence caused by shear heat and relatively high processing temperature, thereby obtaining a granular material having a lower melt index.

9 Claims, 1 Drawing Sheet

(56) References Cited

FOREIGN PATENT DOCUMENTS

| | | | | |
|---|---|---|---|---|
| CN | 103044716 A | * | 4/2013 | ......... B29C 47/0066 |
| CN | 103044866 A | | 4/2013 | |
| CN | 103554857 A | | 2/2014 | |
| CN | 105199352 A | | 12/2015 | |
| CN | 105602215 A | | 5/2016 | |
| CN | 106751358 A | | 5/2017 | |
| CN | 111205605 A | * | 5/2020 | ................ C08J 5/18 |
| CN | 112375350 A | | 2/2021 | |
| CN | 112961480 A | | 6/2021 | |
| CN | 113185776 A | | 7/2021 | |
| CN | 114230993 A | | 3/2022 | |
| CN | 114702793 A | | 7/2022 | |
| CN | 114851528 A | | 8/2022 | |
| CN | 114989586 A | | 9/2022 | |
| CN | 115058108 A | | 9/2022 | |
| CN | 115157478 A | | 10/2022 | |
| CN | 115386211 A | | 11/2022 | |
| CN | 115890962 A | | 4/2023 | |
| DE | 19933476 A1 | | 1/2001 | |
| EP | 3085737 A1 | * | 10/2016 | .............. C08L 67/02 |
| JP | H06143254 A | | 5/1994 | |
| JP | 2004338243 A | | 12/2004 | |
| JP | 2013049790 A | | 3/2013 | |

OTHER PUBLICATIONS

Office Action and Search Report for corresponding Chinese application No. 202310221017.9; dated Apr. 12, 2023 (17 pages).

Notice to Grant Patent for corresponding Chinese application No. 202310221017.9; dated Apr. 27, 2023 (4 pages).

* cited by examiner

GRANULATION PROCESSING METHOD FOR LOW-MELT-INDEX DEGRADABLE MATERIAL, AND SHAPED BODY PREPARED THEREBY

TECHNICAL FIELD

The present application relates to the technical field of processing degradable materials, specifically, to a granulation processing method of low melt index degradable materials and a molded body prepared therefrom.

BACKGROUND ART

Polyhydroxyalkanoate (hereinafter also referred to as PHA) is produced by bacteria through processes such as fermentation, extraction, centrifugation, drying, and crushing to produce powder. However, the powder is not convenient for transportation and processing, therefore, it needs to be further made into granules. Compared with powder, the preparation of granules has the following three advantages: first, the granules are environmentally friendly; second, the granules are convenient for transportation to reduce transportation costs; and third, the granules are convenient for processing.

The existing granulation means include agglomeration granulation, extrusion granulation, jet granulation and the like. Among them, the most common extrusion granulation is twin-screw granulation, which is also the mainstream granulation process in the current market. Extrusion granulation is a process of first melt extrusion through a twin-screw extruder, followed by cooling and pelletization of the extruded melt.

Currently, according to the conventional logic of granulation, there are two main problems that need to be solved in the common twin-screw granulation process when setting process parameter using previous parameters of the granulation process: one is that the extruded melt cannot crystallize quickly, leading to granule adhesion and failure to form a good granular state; and the other is that the resulting granules have a high melt index (melt flow index, MFR).

In the granulation method disclosed in CN114479021A, the melt index is reduced by adding polyol. The processing temperature is preferably 100° C. or above implemented according to this processing process, the resulting melt index is still 30 g/10 min (165° C., 5 kg) or above.

The crystallization efficiency can be greatly accelerated through pre-crystallization, and a granulation method of rapid crystallization is obtained as described in CN115157478B. However, the process and method for adjusting the melt index are not disclosed. According to the existing testing methods, there is a significant difference in the measured melt index between granules and powder.

According to the existing technology, in the conventional extrusion processing process, thermoplastic plastic processing can only obtain better quality granules in a high-temperature environment. During the powder granulation process, due to the presence of thermal degradation (temperature and shear), the molecular weight of the powder will decrease sharply after melting. The melt index of granules produced according to this method will be significantly increased.

Therefore, there is an urgent need for a preparation method to suppress the increase in the melt index of the prepared PHA granules.

SUMMARY

The present application provides a granulation processing method of low melt index degradable materials and a prepared molded body, so as to solve the shortcomings in the prior art, such as high melt index of the prepared granules, a slow crystallization rate during the preparation process, and energy consumption caused by continuous high temperature during equipment operation, the present application achieves a granulation processing method of low melt index degradable materials.

Specifically, the present application provides a granulation processing method of degradable materials, comprising: reducing the temperature of a screw for multiple times and increasing the rotational speed of the screw during the extrusion, crystallization, and granulation process.

The present application found that the above-mentioned method of multiple temperature drops combined with increasing rotational speed is more conducive to increasing the crystallization rate of materials during the granulation process and reducing the thermal degradation of PHA materials due to shear and high temperature in the conventional preparation process, thereby obtaining granules with low melt index.

Preferably, the temperature of the screw is reduced for at least twice; wherein, after the temperature is reduced to a first temperature, the rotational speed of the screw is increased, the temperature is further reduced to a second temperature, and then the resultant is subjected to extrusion for crystallization and granulation.

Preferably, the first temperature is 10° C. below the Tm of the material to 30° C. below the Tm of the material, and the second temperature is 60° C. below the Tm of the material to 100° C. below the Tm of the material.

For example, specifically and non-restrictively, the first temperature may be 10° C. below the Tm of the material, 15° C. below the Tm of the material, 20° C. below the Tm of the material, 25° C. below the Tm of the material, and 30° C. below the Tm of the material. Preferably, the first temperature is 20° C. below the Tm of the material. For example, specifically and non-restrictively, the second temperature may be 60° C. below the Tm of the material, 65° C. below the Tm of the material, 70° C. below the Tm of the material, 75° C. below the Tm of the material, 80° C. below the Tm of the material, 85° C. below the Tm of the material, and 90° C. below the Tm of the material, 95° C. below the Tm of the material, and 100° C. below the Tm of the material. Preferably, the second temperature is 80° C. below the Tm of the material.

In specific embodiments, when reducing the temperature of the extruder screw, a person skilled in the art can choose to reduce the highest temperature to the first temperature (10° C. below the Tm of the material to 30° C. below the Tm of the material) and then increase the rotational speed. For example, it is preferable to reduce the temperature to 20° C. below the Tm of the material and then increase the rotational speed; continue to reduce to the second temperature (60° C. below the Tm of the material to 100° C. below the Tm of the material). For example, it is preferred to reduce the highest temperature to 80° C. below the Tm of the material.

Preferably, after reducing the temperature to the first temperature by way of once cooling or multiple cooling, then increase the screw speed to 2-6 times the initial rotational speed, and continue to reduce the temperature to the second temperature by way of once cooling or multiple cooling, and finally extrusion, crystallization, and granulation are performed.

In order to ensure that the screw can continue to extrude the material, and not make the melt index of the material unstable due to the large shear force caused by the excessive rotational speed. Here, the rotational speed is increased to 2-6 times; Non-restrictively, for example, the speed is increased to 2, 3, 4, 5, or 6 times the initial rotational speed. Specific adjustments can be made within the above range according to the actual requirements of the production efficiency and the required melt index of granules.

Preferably, when reducing the temperature of the screw, all temperature zones of the extruder screw are reduced by the same cooling amplitude, and the highest temperature of all temperature zones is reduced to the first temperature or the second temperature. In specific embodiments, the cooling amplitude can be selected according to the efficiency of the actual processing process or the processing volume and time, such as selecting 10° C., 20° C., 30° C. and the like. In order to obtain higher processing efficiency and processed product quality, the cooling amplitude is preferably 20° C.

Preferably, heat preservation is performed after each cooling; in specific embodiments, a person skilled in the art can adjust the specific duration according to the specific processing process to ensure the normal use of the equipment, reduce the loss caused by the operation, and further improve the processing efficiency at the same time, e.g., heat preservation is performed for 8 min to 30 min.

Preferably, the screw is preheated before starting to reduce the temperature of the screw, and the preheating temperature is between 20° C. above the Tm of the material and 60° C. above the Tm of the material. In specific embodiments, a person skilled in the art can perform incremental temperature settings in sections according to different extruders and materials to ensure that the materials reach a molten state at the end.

Preferably, the granulation processing method of the degradable material further includes pelletization and post-treatment; wherein, the temperature for pelletization is between 10° C. above the Tm of the material and 40° C. below the Tm of the material; and the temperature for post-treatment is 20° C. to 60° C. More preferably, the temperature for pelletization is between 20° C. below the Tm of the material and 40° C. below the Tm of the material. In specific embodiments, when the temperature of the screw is reduced, the temperature of the pelletizer is also reduced at the same cooling amplitude. The temperature for pelletization is reduced from a temperature between 20° C. above the Tm of the material and 40° C. above the Tm of the material to a temperature between 10° C. above the Tm of the material and 40° C. below the Tm of the material.

Wherein, when the highest temperature of all temperature zones of the extruder screw is reduced to the first temperature (10° C. below the Tm of the material to 30° C. below the Tm of the material), the pelletizer cools down to the melting point temperature of the material. When the highest temperature of all temperature zones of the extruder screw is reduced to the second temperature (60° C. below the Tm of the material to 100° C. below the Tm of the material), the pelletizer cools down to 20° C. below the Tm of the material to 40° C. below the Tm of the material. Preferably, the granulation processing method of the degradable material further includes drying, and the drying temperature is 40° C. to 80° C., more preferably 60° C.

Preferably, the materials in the processing method include polymers containing structural unit represented by the following Formula I:

I

In Formula I, R is the alkyl group shown as $C_pH_{2p+1}$, and p is an integer from 1 to 15.

More preferably, p is an integer of 1 to 10, further preferably an integer of 1 to 8. Preferably, R is a straight-chain or branched alkyl group of $C_1$-$C_6$, for example, methyl, ethyl, propyl, butyl, pentyl, hexyl and the like.

In the present application, the polymer is PHA, which can be a single polymer or a combination of two or more polymers. Further, the PHA can be selected from raw materials commonly used in the art, such as polymers containing a 3-hydroxyalkanoate structural unit and/or a 4-hydroxyalkanoate structural unit. Preferably, the PHA comprises at least one poly(3-hydroxyalkanoate). Preferably, the poly(3-hydroxyalkanoate) comprises at least one of the other hydroxyalkanoate structural units (such as 4-hydroxyalkanoate structural unit and the like) and a 3-hydroxybutyrate structural unit. More preferably, in the poly(3-hydroxyalkanoate), the average content ratio of the 3-hydroxybutyrate structural unit to the other structural units is 50:50 to 99:1 (mol %/mol %); further preferably 80:20 to 94:6 (mol %/mol %).

In the present application, when the PHA raw material is a mixture of two or more PHAs, the average content ratio refers to the molar ratio of each monomer contained in the entire mixture. Wherein, the monomer ratio range of (3-hydroxybutyrate): (3-hydroxycaproate) is 80:20 to 99:1, preferably 75:25 to 96:4. Preferably, the PHA is at least one selected from poly(3-hydroxybutyrate), poly(3-hydroxybutyrate-co-3-hydroxypropionate), poly(3-hydroxybutyrate-co-3-hydroxyvalerate), poly(3-hydroxybutyrate-co-3-hydroxyvalerate-co-3-hydroxycaproate), poly(3-hydroxybutyrate-co-3-hydroxycaproate), poly(3-hydroxybutyrate-co-3-hydroxyheptanoate), poly(3-hydroxybutyrate-co-3-hydroxyoctanoate), poly(3-hydroxybutyrate-co-3-hydroxynonanoate), poly(3-hydroxybutyrate-co-3-hydroxydecanoate), poly(3-hydroxybutyrate-co-3-hydroxyundecanoate), and poly(3-hydroxybutyrate-co-4-hydroxybutyrate).

The PHA is particularly preferably produced by microorganisms. In the PHA produced by microorganisms, all 3-hydroxyalkanoate structural units are contained in the form of (R) 3-hydroxyalkanoate structural unit. Further, the weight average molecular weight of the PHA is 50,000 to 2,000,000; preferably 100,000 to 1,500,000; more preferably 600,000 to 800,000.

Preferably, the materials in the processing method further include a nucleating agent. More preferably, the nucleating agent may be an organic material or/and an inorganic material. The organic materials comprise at least one fatty alcohol, fatty acid, saturated fatty acid ester, and saturated aliphatic hydroxy acid. Preferably, the inorganic materials comprise one or more of talc, micronized mica, calcium carbonate, boron nitride, ammonium chloride, sodium salt, carbon black, cyanuric acid, uracil, thymine, mica talc, silicon dioxide, barium nitride, clay, synthetic silicic acid and salt, metal salts of organophosphorus acid and kaolin.

Preferably, the chemical formula of the fatty alcohol is $R_1$—OH, and $R_1$ is a $C_5$-$C_{30}$ alkyl group. More preferably, the fatty alcohol comprises one or more of 1,16-hexadecanediol, 1,22-docosanediol, 1,2-octadecanediol, octacosanol, behenyl alcohol (docosanol), arachidyl alcohol, tetracosanol, 1-hexacosanol, 1-octacosanol, triacontanol, dotriacontanol, 1-tetradecanol, 1-dodecanol and the like; more preferably docosanol.

Preferably, the chemical formula of the fatty acid is $R_2$—COOH, wherein $R_2$ is a $C_5$-$C_{30}$ alkyl group. More preferably, the fatty acid comprises one or more of lauric acid, myristic acid, palmitic acid, stearic acid, arachidic acid, behenic acid (docosanoic acid), lignoceric acid, cerotic acid, octacosanoic acid, and melissic acid; further preferably docosanoic acid.

Preferably, the saturated fatty acid ester comprises one or more of butyl dodecanoate, ethyl pentadecanoate, methyl hexadecanoate, ethyl hexadecanoate, 2-ethylhexyl hexadecanoate, cetyl palmitate, methyl octadecanoate, methyl octadecanoate, methyl eicosanoate, ethyl eicosanoate, methyl behenate, ethyl behenate, lignoceric acid methyl ester, ethyl nervonate, and methyl triacontanoate.

Preferably, the saturated aliphatic hydroxy acid comprises one or more of 2-hydroxydecanoic acid, 3-hydroxyundecanoic acid, 10-hydroxydodecanoic acid, 2-hydroxydodecanoic acid, 12-hydroxydodecanoic acid, 3-hydroxytridecanoic acid, 3-hydroxytetradecanoic acid, 8-hydroxytetradecanoic acid, 15-hydroxypentadecanoic acid, 2-hydroxyhexadecanoic acid, 3-hydroxyhexadecanoic acid, 16-hydroxyhexadecanoic acid, 9,10,16-trihydroxyhexadecanoic acid, 3-hydroxyheptadecanoic acid, 17-hydroxyheptadecanoic acid, 2-hydroxyoctadecanoic acid, 3-hydroxyoctadecanoic acid, 12-hydroxyoctadecanoic acid, 20-hydroxyeicosanoic acid, 2-hydroxydocosanoic acid, and 22-hydroxydocosanoic acid.

In addition, without inhibiting the effect of the present application, the PHA composition of the present application may further comprise auxiliaries such as additives and the like according to the production needs of the product. The additives may comprise organic or inorganic materials such as plasticizers, cross-linking agents, chain extenders, lubricants and the like. Organic or inorganic materials may be used alone or in combination of two or more. Moreover, the additional amount of the additive can also be adjusted according to production needs, and the present application has no particular limitation in this regard.

Preferably, the screw of the extruder can be a twin-screw, a three-screw, a planetary screw, and the like; more preferably, a twin-screw. Preferably, means of pelletization comprise underwater pelletizing, grinding and hot cutting, or water ring cutting; more preferably, underwater pelletizing.

The present application further provides a molded body, which is prepared by using the above-mentioned granulation processing method of degradable materials. The molded body provided by the present application has a melt index of 1 g/10 min to 20 g/10 min when tested at 165° C. and 5 kg. Specifically, when the melt index of the raw material powder is in the range of 1 g/10 min to 5 g/10 min, the molded body prepared by some embodiments of the present application may maintain the melt index at 1 g/10 min to 10 g/10 min; and may even maintain the melt index consistent with the melt index of the input powder, such as 1 g/10 min to 5 g/10 min.

The beneficial effects of the present application are as follows:

The present application provides a granulation processing method for low melt index degradable materials, which can effectively solve the problem of melt index elevation caused by shearing and high temperature in the existing processing process by adopting the method of reducing the temperature in a stepwise manner for multiple times and increasing the rotational speed, and obtain pure granules with low melt index, wherein the optimal melt index of the granules can be consistent with that of the input powder. The present application can speed up the crystallization rate of the material during the granulation processing process by adopting the method of reducing the temperature of the extruder screw, the extrusion pelletization process and the like, and thereby effectively avoiding the adhesion of the produced pure granules due to high surface temperature, and improving the subsequent use of the pure granules.

In addition, compared with the existing process, on the basis of the current extrusion granulation equipment, the low melt index granulation work is completed at a relatively low processing temperature, and the melt index of the prepared granules can be maintained at 1 g/10 min to 10 g/10 min (165° C., 5 kg), and may even be consistent with the melt index of the input powder. Meanwhile, the low-temperature method also reduces the electric heating power and heat exchange power, resulting in lower energy consumption.

BRIEF DESCRIPTION OF THE DRAWINGS

In the FIGURE: 1 to 11 represent setting parts of different temperature zone sections of the extruder screw; 12 is a connector part; 13 is a discharging valve; 14 is a die (Mouthpiece) structure; and 15 is a water tank.

SPECIFIC MODES FOR CARRYING OUT THE EMBODIMENTS

In order to make the purpose, technical solutions, and advantages of the present application more clear, the technical solutions in the present application will be clearly and completely described below with reference to the accompanying drawings of the present application. Obviously, the described Examples are part of the Examples of the present application, rather than the entire Examples. Based on the Examples in the present application, all other Examples obtained by a person skilled in the art without making creative efforts fall within the protection scope of the present application.

If the specific techniques or conditions are not specified in the Examples, the techniques or conditions described in literatures, or the product manual in the art shall be followed. The reagents or instruments used without specifying the manufacturer are conventional products that can be purchased commercially through regular channels.

The raw materials used in the Examples and Comparative Examples are as follows:

Poly(3-hydroxybutyrate-co-3-hydroxyhexanoate) (PHBH), product trademark: BP330, Beijing Bluepha Microbiology Technology Co., Ltd., the content of 3HB (3-hydroxybutyrate unit) is 94%, the weight average molecular weight is about 600,000 to 800,000, Tm is 150° C., and powder MFR=1.48 g/10 min.

Poly(3-hydroxybutyrate-co-3-hydroxyhexanoate) (PHBH), product trademark: BP350, Beijing Bluepha Microbiology Technology Co., Ltd., the content of 3HB (3-hydroxybutyrate unit) is 89%, the weight average molecular weight is about 600,000 to 800,000, Tm is 140° C., and powder MFR=1.52 g/10 min.

Poly(3-hydroxybutyrate-co-3-hydroxyvalerate) (PHBV), Beijing Bluepha Microbiology Technology Co., Ltd., the weight average molecular weight is about 600,000 to 800,000, Tm is 170° C., and powder MFR=1.02 g/10 min.

Poly(3-hydroxybutyrate-co-4-hydroxybutyrate) (P34HB), Beijing Bluepha Microbiology Technology Co., Ltd., the weight average molecular weight is about 600,000 to 800,000, Tm is 180° C., and powder MFR=1.22 g/10 min.

Poly(3-hydroxybutyrate-co-3-hydroxyoctanoate) (PHBO), Beijing Bluepha Microbiology Technology Co., Ltd., the weight average molecular weight is about 600,000 to 800,000, Tm: 100° C., and powder MFR=2.52 g/10 min.

Poly(3-hydroxybutyrate-co-3-hydroxyvalerate-co-3-hydroxyhexanoate (P3HB3HV3HH), Beijing Bluepha Microbiology Technology Co., Ltd., the weight average molecular weight is about 600,000 to 800,000, Tm: 150° C., and powder MFR=4.18 g/10 min.

The equipment used in the Examples and Comparative Examples is as follows:

Twin Screw Extruder: Manufacturer: Keya; Model: HK-36 type twin-screw extruder.

Underwater Pelletizer: Manufacturer: Guangdong Jucheng; Model: UWP500.

Melt Index Tester: Manufacturer: SANS; Model ZRZ2452; Test standard: GB/T 3682-2000, tested at 165° C., 5 kg.

Differential Scanning calorimeter: Manufacturer: TA Instrument; Model: DSC25; Test standard: GB/T 19466.3-2004.

In order to solve the problem of high melt index of PHA granules prepared by existing processing methods, the present application provides a granulation processing method of degradable materials, comprising: reducing the temperature of a screw for multiple times and increasing the rotational speed of the screw during the extrusion, crystallization, and granulation process.

Wherein, the number of times to reduce the temperature of the screw is at least two times.

Wherein, the first temperature is 10° C. below the Tm of the material to 30° C. below the Tm of the material, and the second temperature is 60° C. below the Tm of the material to 100° C. below the Tm of the material.

Wherein, after reducing to the first temperature, the rotational speed of the screw is increased to 2-6 times the initial rotational speed, then reducing the temperature to the second temperature, and finally extrusion, crystallization, and granulation are performed.

Figure 1:
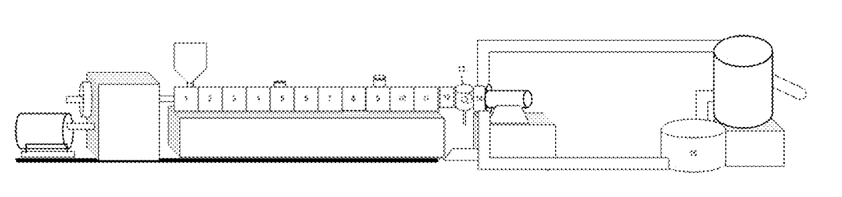
FIG. 1 is a schematic diagram of the temperature zones for granulation processing in Example 1.

Since the temperature zone of the extruder screw in this field often includes multiple temperature zones, such as temperature zones 1 to 11 shown in FIG. 1. When reducing the temperature of the extruder screw, the temperature of all temperature zones of the extruder screw is reduced with the same cooling amplitude. The highest temperature of all the temperature zones is reduced to the first temperature or the second temperature. That is, the first temperature and the second temperature both refer to the highest temperature value set in all temperature zones of the extruder screw. Reducing the temperature of the extruder screw means that the temperatures in temperature zones 1 to 11 are simultaneously reduced by the same amplitude.

Wherein, before starting to reduce the temperature of the extruder screw, the extruder screw is preheated to melt the material; the preheating temperature is between 20° C. above the Tm of the material and 60° C. above the Tm of the material.

In the present application, the equipment includes an extruder and an underwater pelletizer (see FIG. 1), which are operated inline in specific embodiments. In terms of temperature control, the temperature control of the equipment is carried out based on the heating and melting section (zones 1 to 11 in FIG. 1), the pelletization (can be underwater pelletization) section (zones 12 to 14 in FIG. 1) and the post-treatment section (constant-temperature crystallization) (zone 15 in FIG. 1). Wherein, zone 1 is the initial temperature zone after feeding the screw extruder.

In the present application, the temperature sections in the following Examples and Comparative Examples represent the temperatures of zones 1 to 11 in the extruder screw. A person skilled in the art can set the temperature of each temperature zone according to the above description. For example, in Example 1, when the preheating temperature is 60° C. to 180° C., the temperature in zone 1 of the extruder screw is set to 60° C. The temperature is set to 80° C. from zone 2, then the temperature is increased in accordance with a gradient of 20° C. in every 1 to 3 zones thereafter until 180° C., and the temperature is maintained at 180° C.

In specific embodiments, a person skilled in the art can set the temperature of the extruder screw according to the above description. A specific embodiment of the present application is described below with reference to FIG. 1, comprising:

A first step, a material containing PHA (BP350) was added to the hopper of a twin-screw extruder (see above the section marked as 1 in FIG. 1), and the preheating temperature of the extruder screw was set. The temperature was set between 20° C. above the Tm of the material and 60° C. above the Tm of the material, i.e., the temperatures in temperature zones 1 to 11 were set according to the gradient from low to high, and the highest temperature was set between 20° C. above the Tm of the material and 60° C. above the Tm of the material.

Optionally, in specific embodiments, after the temperature reaches the preheating temperature, it is optional to preserve heat for a period of time, such as 30 minutes; and during the period of temperature elevation and heat preservation, the blending operation of PHA powder and additives can be carried out.

In this Example, the initial rotational speed of the extruder screw was 80 r/min to 100 r/min.

In this Example, the preheating temperature can be set as shown in Table 1, the preheating temperature settings for each temperature section from 1 to 11, from temperature zone 1 to zone 11, was ranging from 60° C. to 180° C.

Wherein, structures for powder mixing, forced feeding and the like can also be added to the hopper.

A second step, the temperature of each section of the extruder screw was gradually reduced, and the temperature of all temperature zones of the extruder screw was reduced with the same cooling amplitude to the first temperature (10° C. below the Tm of the material to 30° C. below the Tm of the material).

In this Example, as shown in Table 1, the first temperature setting for each temperature section from 1 to 11, from temperature zone 1 to zone 11, was ranging from 40° C. to 120° C.

Wherein, the highest temperature in all temperature zones of the extruder screw was reduced to 120° C., i.e., 20° C. below the Tm of the material.

A third step, the rotational speed of the extruder screw was increased to 2-6 times the initial rotational speed, and then pelletization was started; the temperatures of all temperature zones of the extruder screw were continually reduced to the second temperature gradually (60° C. below the Tm of the material to 100° C. below the Tm of the material), and the cut granules were subjected to constant temperature for post-treatment through water bath and dried to obtain granular materials.

In this Example, as shown in Table 1, the second temperature setting for each temperature section from 1 to 11, from temperature zone 1 to zone 11, was ranging from 20° C. to 40° C.

Wherein, the highest temperature in all temperature zones of the extruder screw was reduced to 40° C., i.e., 100° C. below the Tm of the material.

TABLE 1

The temperature of the extruder screw using
BP350 powder as raw materials in this Example

| | The temperature range of the extruder screw | | | | | | | | | | |
|---|---|---|---|---|---|---|---|---|---|---|---|
| | 1 | 2 | 3 | 4 | 5 | 6 | 7 | 8 | 9 | 10 | 11 |
| The preheating temperature of equipment (° C.) | 60 | 80 | 120 | 120 | 140 | 140 | 160 | 160 | 180 | 180 | 180 |
| Reducing the temperature to the first temperature (° C.) | 40 | 60 | 80 | 80 | 100 | 100 | 120 | 120 | 120 | 120 | 120 |
| Reducing the temperature to the second temperature (° C.) | 20 | 40 | 40 | 40 | 40 | 40 | 40 | 40 | 40 | 40 | 40 |

In addition to the above-mentioned granulation processing steps of degradable materials, in order to further improve the processing efficiency, the temperature for pelletization and post-treatment processes can also be controlled; wherein, the temperature for pelletization was set between 10° C. above the Tm of the material and 40° C. below the Tm of the material; the temperature for post-treatment was set to 20° C. to 60° C.

In another specific Example, in addition to the granulation process in the above Example, it further includes pelletization and post-treatment process, specifically comprising: A first step, the extruder screw was preheated, the temperatures of connector 12, discharging valve 13, and die 14 were set between 20° C. above the Tm of the material and 40° C. above the Tm of the material while setting the preheating temperature of the extruder screw. The PHA material was added into the preheated screw extruder after the temperature is reached. In this Example, as shown in Table 2, the temperature of connector 12, discharging valve 13, and die 14 was 160° C.

A second step, the temperature of each section of the extruder screw was gradually reduced, and the temperature of all temperature zones of the extruder screw was reduced with the same cooling amplitude to the first temperature.

Wherein, the temperature can be reduced to the first temperature by way of reducing the temperature once or multiple times. If each of the gradually cooling amplitude is set to 20° C., before reducing to the first temperature, it is optional to first reduce the temperature to an intermediate temperature (here, it can be regarded as the first cooling), for example, from the temperature zone 1 to zone 11, the temperature is ranging from 40° C. to 140° C., that is, at this time, the highest temperature in all temperature zones of the extruder screw is reduced to 140° C. Then the temperature is further reduced to the first temperature (10° C. below the Tm of the material to 30° C. below the Tm of the material), which can be regarded as the second cooling.

Wherein, optionally, in order to reduce the losses caused by the operation and ensure the normal use of the equipment, maintain the temperature for a period of time after reaching each cooling gradient, such as 10 minutes, during which the melt extruded by the extrusion head is directly discharged through the pipe at the lower end of the discharging valve 13, while not passing through the die 14. At this time, the directly discharged melt does not pass through the die 14, since the temperature has not yet been reduced to the optimal temperature, the physical properties of this part of the melt have not yet reached the target, so the direct discharge can also be regarded as the clean-up stage. The advantage of such staged cooling is to effectively maintain the continuous operation of the screw extruder and reduce mechanical wear and tear.

At the same time, the temperatures of connector 12, discharging valve 13, and die 14 are also reduced by an amplitude of 20° C. to the melting point temperature Tm. In this Example, as shown in Table 2, the temperatures of connector 12, discharging valve 13, and die 14 were 140° C.; finally, the temperature can be reduced to the range of 100° C. to 140° C.

A third step, the rotational speed of the extruder screw was increased to 2-6 times the initial rotational speed, and then pelletization was started; the temperatures of all temperature zones of the extruder screw were continually reduced to the second temperature gradually (60° C. below the Tm of the material to 100° C. below the Tm of the material). This can be regarded as the third cooling, and the post-treatment temperature was set to 20° C. to 60° C.

Wherein, after increasing the screw speed to 2-6 times the initial rotational speed, and the temperature was continually reduced to the second temperature by way of once cooling or multiple cooling, and then extrusion, crystallization, and granulation were performed.

In the actual processing process, cooling can be carried out multiple times before reducing to the first and second temperatures in the cooling process, that is, multiple intermediate temperatures are comprised. The specific cooling amplitude and the number of cooling times can be adjusted according to the need for actual processing time and granulation speed.

In this Example, the cut granules were subjected to a constant temperature for post-treatment through a water bath (60° C. constant temperature of water bath for post-treatment) and dried to obtain granular materials.

TABLE 2

The pelletization temperature set using BP
350 powder as raw materials in this Example

| Pelletization temperature section | Connector 12 | Discharging valve 13 | Die 14 |
|---|---|---|---|
| The preheating temperature of equipment (° C.) | 160 | 160 | 160 |
| Reducing the temperature to the first temperature (° C.) | 140 | 140 | 140 |
| Reducing the temperature to the second temperature (° C.) | 100~140 | 100~140 | 100~140 |

The present application found that when the temperature decreases, the melt pressure will increase; in this step, the closer to the highest melt pressure upper limit of the equipment, the lower the decreased temperature of the extruder screw equipment (especially when the second temperature reaches 60° C. below the Tm of the material), and the lower the melt index produced by the granules.

The following Examples 1 to 40 were prepared by the above preparation method, and Comparative Examples 1 to 24 adopted the existing conventional preparation method.

TABLE 3

Examples of granulation using BP350 powder as raw materials

| | Example 1 | Example 2 | Example 3 | Example 4 | Example 5 | Example 6 |
|---|---|---|---|---|---|---|
| Formula (parts by weight) | | | | | | |
| BP350 | 100 | 100 | 100 | 100 | 100 | 100 |
| Boron nitride | 2 | | | | | |
| Silica | | 2 | | | | |
| Docosanol | | | 2 | | | |
| Docosanoic acid | | | | 2 | | |
| Methyl hexadecanoate | | | | | 2 | |
| 3-hydroxyhexadecanoic acid | | | | | | 2 |
| Processing parameters | | | | | | |
| The preheating temperature of equipment (° C.) | 60~180 | 60~180 | 60~180 | 60~180 | 60~180 | 60~180 |
| Reducing the temperature to the first temperature (° C.) | 40~120 | 40~120 | 40~120 | 40~120 | 40~120 | 40~120 |
| Reducing the temperature to the second temperature (° C.) | 40 | 40 | 40 | 40 | 40 | 40 |
| Initial speed of the extruder screw (r/min) | 80 | 80 | 80 | 80 | 80 | 80 |
| Rotational speed of the extruder screw during pelletization (r/min) | 250 | 250 | 250 | 250 | 250 | 250 |
| The temperature of die and underwater melt pelletizing (° C.) | 100 | 100 | 100 | 100 | 100 | 100 |
| Post-crystallization temperature (° C.) | 50 | 50 | 50 | 50 | 50 | 50 |
| Physical parameters | | | | | | |
| Melt index (g/10 min) | 7.20 | 5.20 | 3.20 | 1.50 | 4.36 | 2.13 |

TABLE 4

Examples of granulation using BP330 powder as raw materials

| | Example 7 | Example 8 | Example 9 | Example 10 | Example 11 | Example 12 |
|---|---|---|---|---|---|---|
| Formula (parts by weight) | | | | | | |
| BP330 | 100 | 100 | 100 | 100 | 100 | 100 |
| Boron nitride | 2 | | | | | |
| Silica | | 2 | | | | |
| Docosanol | | | 2 | | | |
| Docosanoic acid | | | | 2 | | |
| Methyl hexadecanoate | | | | | 2 | |
| 3-Hydroxyhexadecanoic acid | | | | | | 2 |
| Processing parameters | | | | | | |
| The preheating temperature of equipment (° C.) | 60~190 | 60~190 | 60~190 | 60~190 | 60~190 | 60~190 |
| Reducing the temperature to the first temperature (° C.) | 50~130 | 50~130 | 50~130 | 50~130 | 50~130 | 50~130 |
| Reducing the temperature to the second temperature (° C.) | 50 | 50 | 50 | 50 | 50 | 50 |
| Initial speed of the extruder screw (r/min) | 100 | 100 | 100 | 100 | 100 | 100 |
| Rotational speed of the extruder screw during pelletization (r/min) | 250 | 250 | 250 | 250 | 250 | 250 |
| The temperature of die and underwater melt pelletizing (° C.) | 120 | 120 | 120 | 120 | 120 | 120 |
| Post-crystallization temperature (° C.) | 40 | 40 | 40 | 40 | 40 | 40 |
| Physical parameters | | | | | | |
| Melt index (g/10 min) | 6.12 | 4.32 | 3.50 | 1.60 | 3.26 | 2.05 |

TABLE 5

Example of granulation using PHBV powder as raw materials

|  | Example 13 | Example 14 | Example 15 | Example 16 | Example 17 | Example 18 |
|---|---|---|---|---|---|---|
| Formula (parts by weight) | | | | | | |
| PHBV | 100 | 100 | 100 | 100 | 100 | 100 |
| Boron nitride | 2 | | | | | |
| Silica | | 2 | | | | |
| Docosanol | | | 2 | | | |
| Docosanoic acid | | | | 2 | | |
| Methyl hexadecanoate | | | | | 2 | |
| 3-Hydroxyhexadecanoic acid | | | | | | 2 |
| Processing parameters | | | | | | |
| The preheating temperature of equipment (° C.) | 70~190 | 70~190 | 70~190 | 70~190 | 70~190 | 70~190 |
| Reducing the temperature to the first temperature (° C.) | 70~150 | 70~150 | 70~150 | 70~150 | 70~150 | 70~150 |
| Reducing the temperature to the second temperature (° C.) | 70 | 70 | 70 | 70 | 70 | 70 |
| Initial speed of the extruder screw (r/min) | 100 | 100 | 100 | 100 | 100 | 100 |
| Rotational speed of the extruder screw during pelletization (r/min) | 400 | 400 | 400 | 400 | 400 | 400 |
| The temperature of the die and underwater melt pelletizing (° C.) | 150 | 150 | 150 | 150 | 150 | 150 |
| Post-crystallization temperature (° C.) | 20 | 20 | 20 | 20 | 20 | 20 |
| Physical parameters | | | | | | |
| Melt index (g/10 min) | 5.20 | 4.38 | 3.26 | 1.10 | 3.06 | 2.10 |

TABLE 6

Examples of granulation using P34HB powder as raw materials

|  | Example 19 | Example 20 | Example 21 | Example 22 | Example 23 | Example 24 |
|---|---|---|---|---|---|---|
| Formula (parts by weight) | | | | | | |
| P34HB | 100 | 100 | 100 | 100 | 100 | 100 |
| Boron nitride | 2 | | | | | |
| Silica | | 2 | | | | |
| Docosanol | | | 2 | | | |
| Docosanoic acid | | | | 2 | | |
| Methyl hexadecanoate | | | | | 2 | |
| 3-Hydroxyhexadecanoic acid | | | | | | 2 |
| Processing parameters | | | | | | |
| The preheating temperature of equipment (° C.) | 60~200 | 60~200 | 60~200 | 60~200 | 60~200 | 60~200 |
| Reducing the temperature to the first temperature (° C.) | 60~160 | 60~160 | 60~160 | 60~160 | 60~160 | 60~160 |
| Reducing the temperature to the second temperature (° C.) | 60~80 | 60~80 | 60~80 | 60~80 | 60~80 | 60~80 |
| Initial speed of the extruder screw (r/min) | 80 | 80 | 80 | 80 | 80 | 80 |
| Rotational speed of the extruder screw during pelletization (r/min) | 480 | 480 | 480 | 480 | 480 | 480 |
| The temperature of die and underwater melt pelletizing (° C.) | 160 | 160 | 160 | 160 | 160 | 160 |
| Post-crystallization temperature (° C.) | 40 | 40 | 40 | 40 | 40 | 40 |
| Physical parameters | | | | | | |
| Melt index (g/10 min) | 6.23 | 5.14 | 4.26 | 3.24 | 1.50 | 3.15 |

TABLE 7

Examples of granulation using PHBO powder as raw materials

| | Example 25 | Example 26 | Example 27 | Example 28 | Example 29 | Example 30 |
|---|---|---|---|---|---|---|
| Formula (parts by weight) | | | | | | |
| PHBO | 100 | 100 | 100 | 100 | 100 | 100 |
| Boron nitride | 2 | | | | | |
| Silica | | 2 | | | | |
| Docosanol | | | 2 | | | |
| Docosanoic acid | | | | 2 | | |
| Methyl hexadecanoate | | | | | 2 | |
| 3-Hydroxyhexadecanoic acid | | | | | | 2 |
| Processing parameters | | | | | | |
| The preheating temperature of equipment (° C.) | 30~160 | 30~160 | 30~160 | 30~160 | 30~160 | 30~160 |
| Reducing the temperature to the first temperature (° C.) | 30~80 | 30~80 | 30~80 | 30~80 | 30~80 | 30~80 |
| Reducing the temperature to the second temperature (° C.) | 30 | 30 | 30 | 30 | 30 | 30 |
| Initial speed of the extruder screw (r/min) | 80 | 80 | 80 | 80 | 80 | 80 |
| Rotational speed of the extruder screw during pelletization (r/min) | 160 | 160 | 160 | 160 | 160 | 160 |
| The temperature of die and underwater melt pelletizing (° C.) | 80 | 80 | 80 | 80 | 80 | 80 |
| Post-crystallization temperature (° C.) | 60 | 60 | 60 | 60 | 60 | 60 |
| Physical parameters | | | | | | |
| Melt index (g/10 min) | 8.26 | 6.25 | 4.38 | 2.80 | 4.56 | 3.10 |

TABLE 8

Examples of granulation using P3HB3HV3HH powder as raw materials

| | Example 31 | Example 32 | Example 33 | Example 34 | Example 35 | Example 36 |
|---|---|---|---|---|---|---|
| Formula | | | | | | |
| P3HB3HV3HH | 100 | 100 | 100 | 100 | 100 | 100 |
| Boron nitride | 2 | | | | | |
| Silica | | 2 | | | | |
| Docosanol | | | 2 | | | |
| Docosanoic acid | | | | 2 | | |
| Methyl hexadecanoate | | | | | 2 | |
| 3-Hydroxyhexadecanoic acid | | | | | | 2 |
| Processing parameters | | | | | | |
| The preheating temperature of equipment (° C.) | 50~180 | 50~180 | 50~180 | 50~180 | 50~180 | 50~180 |
| Reducing the temperature to the first temperature (° C.) | 50~130 | 50~130 | 50~130 | 50~130 | 50~130 | 50~130 |
| Reducing the temperature to the second temperature (° C.) | 50 | 50 | 50 | 50 | 50 | 50 |
| Initial speed of the extruder screw (r/min) | 100 | 100 | 100 | 100 | 100 | 100 |
| Rotational speed of the extruder screw during pelletization (r/min) | 300 | 300 | 300 | 300 | 300 | 300 |
| The temperature of die and underwater melt pelletizing (° C.) | 120 | 120 | 120 | 120 | 120 | 120 |
| Post-crystallization temperature (° C.) | 50 | 50 | 50 | 50 | 50 | 50 |
| Physical parameters | | | | | | |
| Melt index (g/10 min) | 10.56 | 8.24 | 6.35 | 5.20 | 6.10 | 5.46 |

As can be seen from Tables 3-8, only for the type of nucleating agent, when docosanoic acid is selected as the nucleating agent, the melt index of the produced granules is lower than that using other nucleating agents.

TABLE 9

Examples of granulation using BP350-based blended powder as raw materials

| Formula (parts by weight) | Example 37 | Example 38 | Example 39 | Example 40 |
|---|---|---|---|---|
| BP350 | 80 | 80 | 80 | 80 |
| PHBV | | | | 20 |
| P34HB | | | 20 | |
| PHBO | | 20 | | |
| P3HB3HV3HH | 20 | | | |
| Docosanoic acid | 2 | 2 | 2 | 2 |
| Processing parameters | | | | |
| The preheating temperature of equipment (° C.) | 60~180 | 60~180 | 60~180 | 60~180 |
| Reducing the temperature to the first temperature (° C.) | 40~120 | 40~120 | 40~120 | 40~120 |
| Reducing the temperature to the second temperature (° C.) | 40 | 40 | 40 | 40 |
| Initial speed of the extruder screw (r/min) | 100 | 100 | 100 | 100 |
| Rotational speed of the extruder screw during pelletization (r/min) | 250 | 250 | 250 | 250 |
| The temperature of die and underwater melt pelletizing (° C.) | 100 | 100 | 100 | 100 |
| Post-crystallization temperature (° C.) | 50 | 50 | 50 | 50 |
| Physical parameters | | | | |
| Melt index (g/10 min) | 2.15 | 1.64 | 1.60 | 1.20 |

The temperature setting of the extruder screw in the Comparative Example is the temperature setting in zones 1 to 11 in FIG. 1, and the temperature was set in sequence according to the marked temperature of the Comparative Example.

In Comparative Examples 1-2: the temperature in zone 1 was set to 40° C. as the feeding temperature, and the temperature was set to 80° C. from zone 2 and increased in accordance with a gradient of 20° C. in every 1-3 zones thereafter until 20° C. above the Tm of BP350, and the temperature thereafter was maintained at 20° C. above the Tm of BP350 (i.e. 160° C.).

In Comparative Examples 3-4: the temperature in zone 1 is set to 40° C. as the feeding temperature, and the temperature was set to 80° C. from zone 2 and increased in accordance with a gradient of 20° C. in every 1-3 zones thereafter until 20° C. above the Tm of BP330, and the temperature thereafter was maintained at 20° C. above the Tm of BP330 (i.e. 170° C.).

In Comparative Examples 5-6: the temperature in zone 1 was set to 40° C. as the feeding temperature, and the temperature was set to 80° C. from zone 2 and increased in accordance with a gradient of 20° C. in every 1-3 zones thereafter until 20° C. above the Tm of PHBV, and the temperature thereafter was maintained at 20° C. above the Tm of PHBV (i.e. 190° C.).

In Comparative Examples 7-8: the temperature in zone 1 was set to 40° C. as the feeding temperature, and the temperature was set to 80° C. from zone 2 and increased in accordance with a gradient of 20° C. in every 1-3 zones thereafter until 20° C. above the Tm of P34HB, and the temperature thereafter was maintained at 20° C. above the Tm of P34HB (i.e. 200° C.).

In Comparative Examples 9-10: the temperature in zone 1 was set to 40° C. as the feeding temperature, and the temperature was set to 80° C. from zone 2 and increased in accordance with a gradient of 20° C. in every 1-3 zones thereafter until 20° C. above the Tm of PHBO, and the temperature thereafter was maintained at 20° C. above the Tm of PHBO (i.e. 120° C.).

In Comparative Examples 11-12: the temperature in zone 1 was set to 40° C. as the feeding temperature, and the temperature was set to 80° C. from zone 2 and increased in accordance with a gradient of 20° C. in every 1-3 zones thereafter until 20° C. above the Tm of P3HB3HV3HH, and the temperature thereafter was maintained at 20° C. above the Tm of P3HB3HV3HH (i.e. 170° C.).

TABLE 10

Comparative Examples of granulation using different PHA materials as raw materials using existing processes

| | Comparative Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Formula (parts by weight) | | | | | | | | | | | | |
| BP350 | 100 | 100 | | | | | | | | | | |
| BP330 | | | 100 | 100 | | | | | | | | |
| PHBV | | | | | 100 | 100 | | | | | | |
| P34HB | | | | | | | 100 | 100 | | | | |
| PHBO | | | | | | | | | 100 | 100 | | |

TABLE 10-continued

Comparative Examples of granulation using different PHA materials as raw materials using existing processes

| | Comparative Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| P3HB3HV3HH | | | | | | | | | | | 100 | 100 |
| Boron nitride | 2 | | 2 | | 2 | | 2 | | 2 | | 2 | |
| Docosanoic acid | | 2 | | 2 | | 2 | | 2 | | 2 | | 2 |
| Processing parameters | | | | | | | | | | | | |
| The preheating temperature of equipment (° C.) | 40~160 | 40~160 | 40~170 | 40~170 | 40~190 | 40~190 | 40~200 | 40~200 | 40~120 | 40~120 | 40~170 | 40~170 |
| Reducing the temperature to the first temperature (° C.) | 160 | 160 | 170 | 170 | 210 | 210 | 220 | 220 | 140 | 140 | 190 | 190 |
| Reducing the temperature to the second temperature (° C.) | 50 | 50 | 40 | 40 | 20 | 20 | 40 | 40 | 60 | 60 | 50 | 50 |
| Physical parameters | | | | | | | | | | | | |
| Melt index (g/10 min) | 160 | 80 | 152 | 73 | 52 | 38 | 49 | 39 | 102 | 54 | 116 | 58 |

In Comparative Examples 13 to 16: the temperature in zone 1 was set to 40° C. as the feeding temperature, and the temperature was set to 80° C. from zone 2 and increased in accordance with a gradient of 20° C. in every 1-3 zones thereafter until 20° C. above the Tm, and the temperature thereafter was maintained at 20° C. above the Tm (i.e. 160° C.).

TABLE 11

Comparative examples of granulation using raw materials with BP350 as the main blended powder

| Formula (parts by weight) | Comparative Example 13 | Comparative Example 14 | Comparative Example 15 | Comparative Example 16 |
|---|---|---|---|---|
| BP350 | 80 | 80 | 80 | 80 |
| PHBV | | | | 20 |
| P34HB | | | 20 | |
| PHBO | | 20 | | |
| P3HB3HV3HH | 20 | | | |
| Docosanoic acid | 2 | 2 | 2 | 2 |
| Processing parameters | | | | |
| Setting temperature of extruder screw (° C.) | 40~160 | 40~150 | 40~160 | 40~160 |
| The temperature of die and underwater melt pelletizing (° C.) | 180 | 180 | 180 | 180 |
| Post-crystallization temperature (° C.) | 50 | 50 | 50 | 50 |
| Physical parameters | | | | |
| Melt index (g/10 min) | 85 | 93 | 66 | 62 |

Settings are made by adopting pre-crystallization in Comparative Examples 17 to 24, as shown in Table 12:

TABLE 12

Comparative Examples of granulation using the scheme of pre-crystallization

| | Comparative Examples | | | | | | | |
|---|---|---|---|---|---|---|---|---|
| | 17 | 18 | 19 | 20 | 21 | 22 | 23 | 24 |
| Formula (parts by weight) | | | | | | | | |
| BP350 | 100 | | | | | | 80 | 80 |
| BP330 | | 100 | | | | | 20 | |
| PHBV | | | 100 | | | | | 20 |
| P34HB | | | | 100 | | | | |
| PHBO | | | | | 100 | | | |

TABLE 12-continued

Comparative Examples of granulation using the scheme of pre-crystallization

| | Comparative Examples | | | | | | | |
|---|---|---|---|---|---|---|---|---|
| | 17 | 18 | 19 | 20 | 21 | 22 | 23 | 24 |
| P3HB3HV3HH | | | | | | 100 | | |
| Docosanoic acid | 2 | 2 | 2 | 2 | 2 | 2 | 2 | 2 |
| Processing parameters | | | | | | | | |
| Pre-crystallization temperature of extruder screw (° C.) | 110 | 120 | 150 | 160 | 80 | 130 | 110 | 110 |
| The temperature of die and underwater melt pelletizing (° C.) | 140 | 150 | 170 | 180 | 100 | 150 | 140 | 140 |
| Post-crystallization temperature (° C.) | 50 | 40 | 20 | 40 | 60 | 50 | 50 | 50 |
| Physical parameters | | | | | | | | |
| Melt index (g/10 min) | 35 | 32 | 23.6 | 28.5 | 38 | 46 | 36 | 33.6 |

It can be seen from Comparative Examples 1 to 16 that the granules obtained using conventional technical solutions have a higher melt index, which is more restrictive to the subsequent processing applications. By comparing the above Examples and Comparative Examples, it can be found that the increased rotational speed in the Examples is in the range of 2-6 times, in which stable extrusion can be achieved and the melt index of the prepared granules is lower than that of the granules in the Comparative Examples.

By comparing Examples 1-6 with Comparative Examples 1-2, it can be concluded that PHBH (BP350) granules with lower melt index can be obtained using the granulation processing method of the present application. By comparing Examples 7-12 with Comparative Examples 3-4, it can be concluded that PHBH (BP330) granules with lower melt index can be obtained using the granulation processing method of the present application. By comparing Examples 13-18 with Comparative Examples 5-6, it can be concluded that PHBV granules with lower melt index can be obtained using the granulation processing method of the present application. By comparing Examples 19-24 with Comparative Examples 7-8, it can be concluded that P34HB granules with lower melt index can be obtained using the granulation processing method of the present application. By comparing Examples 25-30 with Comparative Examples 9-10, it can be concluded that PHBO granules with lower melt index can be obtained using the granulation processing method of the present application. By comparing Examples 31-36 with Comparative Examples 11-12, it can be concluded that P3HB3HV3HH granules with lower melt index can be obtained using the granulation processing method of the present application. By comparing Examples 37-40 with Comparative Examples 13-16, it can be concluded that blend granules with lower melt index can be obtained using the granulation processing method of the present application.

It can be concluded from Table 12 that the melting index of the granules prepared by adopting the scheme of pre-crystallization used in Comparative Examples 17-24 is in the range of 23.6 g/10 min to 38 g/10 min. It is obvious that the melting index of the granules obtained by using the granulation processing method of the present application is lower than that obtained by using the scheme of pre-crystallization.

Finally, it should be noted that the above examples are only used to illustrate the technical solution of the present application and are not intended to limit the same. Although the present application has been described in detail with reference to the aforementioned examples, those skilled in the art should understand that they can still modify the technical solutions recited in the aforementioned examples or make equivalent substitutions for some of the technical features. These modifications or substitutions do not depart the essence of the corresponding technical solutions from the spirit and scope of the technical solutions of each example of the present application.

INDUSTRIAL APPLICABILITY

The present application provides a granulation processing method for low melt index degradable materials, which can effectively solve the problem of melt index elevation caused by shearing and high temperature in the existing processing process by adopting the method of reducing the temperature in a stepwise manner for multiple times and increasing the rotational speed, and pure granules with low melt index can be obtained. The optimal melt index of the granules can be consistent with the input powder; and by adopting the method of reducing the temperatures of the extruder screw, the extrusion granulation process and the like, the crystallization rate of the material can be accelerated during the granulation processing process, which effectively avoids the adhesion of the produced pure granules due to high surface temperature, and improves the subsequent use of the pure granules. Compared with the existing process, on the basis of the current extrusion granulation equipment, the low melt index granulation work is completed at a relatively low processing temperature, and the melt index of prepared granules can be maintained to 1 g/10 min to 10 g/10 min (165° C., 5 kg), and may even be consistent with the melt index of the input powder. Meanwhile, the adoption of a low-temperature method also reduces the electric heating power and heat exchange power, resulting in lower energy consumption.

What is claimed is:

1. A granulation processing method of degradable materials, comprising steps of:
    reducing a temperature of a screw for multiple times and increasing a rotational speed of the screw during an extrusion, crystallization, and granulation process; wherein materials added in the granulation processing method of degradable materials include polyhydroxyalkanoates;
    the temperature of the screw is reduced at least two times; wherein, after the temperature is reduced to a first reduced temperature, the rotational speed of the screw is increased, the temperature is then further reduced to a second reduced temperature, and then a resultant material is subjected to extrusion for crystallization and granulation;

the first reduced temperature is 10° C. below a melting temperature of the degradable material to 30° C. below the melting temperature of the degradable material, and the second reduced temperature is 60° C. below the melting temperature of the degradable material to 100° C. below the melting temperature of the degradable material.

2. The granulation processing method of degradable materials of claim 1, wherein the rotational speed of the screw is increased to 2-6 times an initial rotational speed.

3. The granulation processing method of degradable materials of claim 2, wherein when reducing the temperature of the screw, all temperature zones of the screw are reduced by a same cooling amplitude, and a highest temperature of all of the temperature zones is reduced to the first reduced temperature or to the second reduced temperature.

4. The granulation processing method of degradable materials of claim 3, wherein heat preservation is performed after each temperature reduction.

5. The granulation processing method of degradable materials of claim 3, wherein the screw is preheated before starting to reduce the temperature of the screw, and the screw is preheated to a preheating temperature between 20° C. above the melting temperature of the degradable material and 60° C. above the melting temperature of the degradable material.

6. The granulation processing method of degradable materials of claim 5, further comprising pelletization and post-treatment; wherein, a temperature for pelletization is between 10° C. above the melting temperature of the degradable material and 40° C. below the melting temperature of the degradable material; and a temperature for post-treatment is 20° C. to 60° C.

7. The granulation processing method of degradable materials of claim 1, wherein the degradable materials added in the granulation processing method include polymers containing a structural unit represented by the following Formula I:

$$[CHRCH_2COO] \qquad \text{I}$$

wherein in Formula I, R is the alkyl group having the formula $C_pH_{2p+1}$, and p is an integer of from 1 to 15.

8. The granulation processing method of degradable materials of claim 7, wherein materials in the processing method further include a nucleating agent.

9. The granulation processing method of degradable materials of claim 4, wherein the screw is preheated before starting to reduce the temperature of the screw, and the screw is preheated to a preheating temperature between 20° C. above the melting temperature of the degradable material and 60° C. above the melting temperature of the degradable material.

* * * * *